United States Patent Office 3,562,899
Patented Feb. 16, 1971

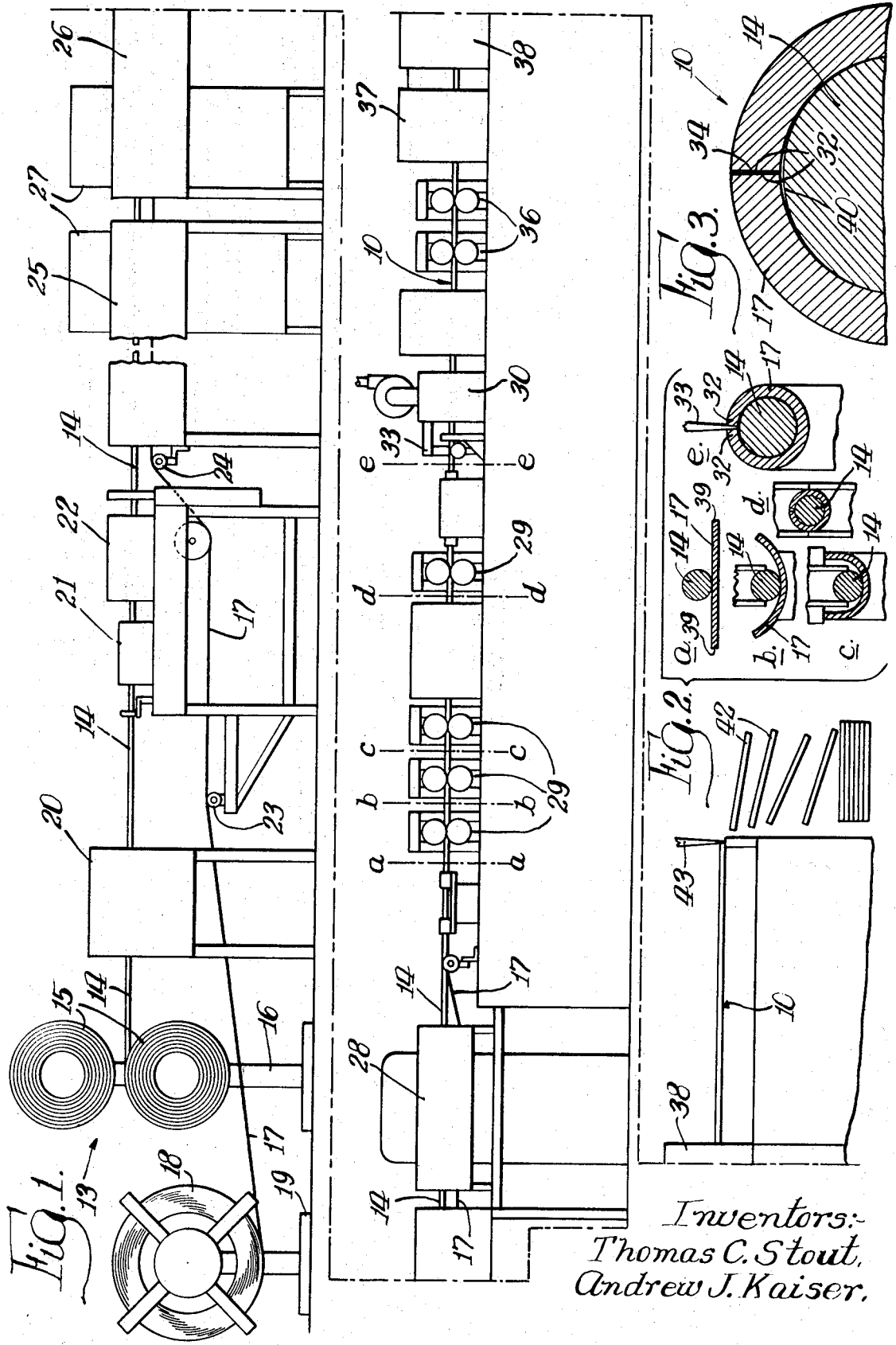

3,562,899
METHOD OF FORMING A SHEATHED ELEMENT
Thomas C. Stout, Concord, Mass., and Andrew J. Kaiser, Muskegon, Mich., assignors to Brunswick Corporation
Filed June 13, 1968, Ser. No. 736,649
Int. Cl. B21d 39/04
U.S. Cl. 29—474.1          5 Claims

ABSTRACT OF THE DISCLOSURE

A method of forming a clad wire wherein a wire is fed longitudinally to a cladding zone, a strip of sheathing material is deformed about the wire, opposed portions of the strip are secured together by means extending less than fully through the strip to define an effectively tubular sheath about the wire. The sheathing material herein is metal and the securing of the apposed portions of the sheath is effected by welding. The sheathed wire may be subsequently cut to preselected lengths for further processing.

BACKGROUND OF THE INVENTION

Field of the invention

This invention relates to metal forming, and, in particular to wire cladding processes and apparatus for performing the same.

Description of the prior art

Conventional methods of sheathing wire are by plating the wire, as by electroplating, or by hot melt dipping operations. Another known method of cladding wire is to provide bonding material on the wire and forming a sheet of cladding material about the wire to be bonded thereto by the bonding material. Illustratively, the bonding material may comprise solder with the securing step comprising a fusing of the solder and subsequent cooling thereof to effect the desired band.

A number of cladding processes have been developed wherein a sheet is wrapped around the wire and secured to the wire, as by welding through the sheet, to provide a positive retained association of the sheet and wire. In certain cladding steps, the sheet is formed of a relatively soft material which is merely deformed about the wire and retains its deformed sheathing configuration.

SUMMARY OF THE INVENTION

The present invention comprehends an improved method of forming a sheathed element, such as a clad wire, wherein a metal sheath is associated with the wire to define a cladding thereon while substantially unaffecting the metallurgical characteristics of the wire. The invention comprehends providing the sheath by a unique welding step, permitting the sheath to be formed from a sheet material deformed about the wire continuously for effectively maximum economy while yet maintaining the desired metallurgical characteristics of the wire.

Thus, more specifically, the invention comprehends the method of forming a sheathed element including the steps of feeding a wire longitudinally to a cladding zone, feeding a cladding strip longitudinally into juxtaposition to the wire at the zone, the strip being formed of a deformable material differing from that of the wire, forming the strip at the zone circumferentially about the wire to sheath the wire, and welding together the juxtaposed longitudinal edges of the strip less than fully through the thickness of the strip.

Still further, more specifically, the invention comprehends the provision of an apparatus for forming a sheathed element including means for longitudinally feeding a wire to a cladding zone, means for longitudinally feeding a cladding strip into juxtaposition to the wire at the zone, die means for upturning and inturning the longitudinal edges of the strip about the wire at the zone to define a sheath thereabout, means for welding together the longitudinal edges less than fully through the thickness thereof, and means for positioning the edges of the sheath in alignment with the welding means for welding thereof by the welding means as the sheathed wire is fed through the zone.

BRIEF DESCRIPTION OF THE DRAWING

Other features and advantages of the invention will be apparent from the following description taken in connection with the accompanying drawing wherein:

FIG. 1 is a schematic side elevation of an apparatus for forming a sheathed element by the method of the invention;

FIG. 2 is a schematic illustration of the cross-section of the wire and cladding material at planes a—a, b—b, c—c, d—d, and e—e; and FIG. 3 is a fragmentary enlarged transverse cross-section of the sheathed wire subsequent to the welding operation.

DESCRIPTION OF THE PREFERRED EMBODIMENT

In the exemplary embodiment of the invention as disclosed in the drawing, a clad wire, generally designated 10, comprises a wire 11 clad in a sheath 12 by a new and improved method whereby the physical characteristics of the wire 11 are maintained notwithstanding the welding of sheath 12 to retain it in sheathed association with the wire 11. The process may be best understood by reference to FIG. 1 illustrating an apparatus 13 for practicing the process in connection with a metal wire clad with a metal sheath while maintaining the metallurgical characteristics of the wire.

More specifically, the wire 11 is provided originally as a large diameter wire 14 which is fed into the apparatus 13 from suitable spools 15 carried on a conventional feed stand 16. The sheath 12 is formed from a strip 17 which may be fed into the apparatus 13 from a roll 18 carried on a conventional roll stand 19. The wire 14 may comprise a ¼" diameter stainless steel wire and the strip 17 may comprise a strip of Monel metal having a thickness of approximately .018" to .020" and a width of approximately .875".

To permit continuous feed through the apparatus 13, a wire welder 20 may be provided. Thus, when the end of one spool 15 is reached, the wire from the next spool may be coaxially connected thereto by the welder 20 to permit substantially continuous operation of the apparatus. From the welder 20, the wire 14 passes through an oiler 21 and a straightener 22. As shown in FIG. 1, the strip 17 passes under the welder 20, oiler 21 and straightener 22, being carried on suitable guide rolls 23 and 24.

The wire 14 and strip 17 are then fed through a cleaning tank 25 and a rinse tank 26 wherein they are thoroughly cleaned. In the illustrated embodiment the cleaning is effected by subjecting the wire and strip to an aqueous cleaning and rinsing medium. Suitable hot water heaters 27 may be provided for delivering the cleaning and rinsing water at relative high temperature to tanks 25 and 26. As will be obvious to those skilled in the art, other suitable methods of cleaning the wire and strip may be employed.

The cleaned and rinsed wire and strip are then dried in a conventional dryer unit 28.

From the dryer 28, the wire 14 and strip 17 are delivered to a plurality of strip forming rolls 29 which deform the strip 17 about the wire 14, as illustrated in FIG. 2. Thus, as shown in FIG. 2a, the strip 17 is delivered to the forming rolls 29 as a flat strip engaging the bottom of the wire 14 and extending longitudinally parallel thereto. The forming rolls successively bend the strip 17 about the wire 14 to the enclosed configuration of FIG. 2d. The thusly wrapped wire is then deliverd to a welder 30 with the juxtaposed edges 31 and 32 of the rolled strip 17 maintained in accurate uppermost disposition by a knife blade seam aligner 33.

The weld 34 effected by welder 30 herein extends less than fully through the sheath strip and illustratively, may extend approximately 95 percent therethrough. Weld 34 may comprise a series of spot welds spaced longitudinally of the strip, the closeness thereof being sufficient to assure proper retention of the sheath 12 about the wire for subsequent forming operations, as will be discussed herefollowing. In certain applications, the weld 34 may comprise a substantially continuous weld. The invention, however, comprehends the provision of any such weld to extend less than fully through the sheath so as to effectively preclude affecting the metallurgical characteristics of the subjacent wire as occurs where such a weld extends fully through the sheath or where the weld actually extends to the adjacent wire to joint the sheath physically to the wire. In the present invention, a sufficient depth of weld is provided to permit the desired subsequent forming operations while yet precluding undesirable changes in the physical characteristics of the wire being clad.

The seam aligner 33 may comprise a disc having a sharp edge, as shown in FIG. 2e, to minimize friction and abrasion of the opposite edges 32 of the strip 17.

From the welder 30 the sheathed wire 10 may be delivered through suitable sizing rolls 36 to an eddy current detector apparatus 37 of conventional construction for detecting improper welds. The detector 37 may control an adjacent paint spray device 38 to spray improperly welded portions of the sheathed wire 10 for subsequent identification permitting discard or rewelding thereof. The clad wire 10 may be cut into discrete lengths 42 by a conventional flying cutting means 43.

If desired, a straightener (not shown) may be employed subsequent to the sizing rolls.

The various components of the apparatus, as discussed above, are conventional. However, as will be obvious to those skilled in the art, the forming roller arrangements may be varied to provide the wripping step in conformity with different size and flexibility strips. Further, the welder 30 may be provded to have adjustability of the weld depth for maximum efficiency of the cladding process. As the welds 34 are provided in apparatus 13 primarily as a means for maintaining a sheathed association of the strip 17 relative to the wire 14 for uniform constriction of the clad wire 10 by constricting die means such as in the process of the U. S. Webber and Wilson Letters Pat. No. 3,277,564, the welding depth and spacing may be suitably correspondingly varied for different sheath materials.

As shown in FIG. 3, the sheathing strip 17 defines a generally tubular configuration wherein the confronting edges 32 of the strip are spaced outwardly from the wire 14 to define a clearance space 40 therewith. The radial thickness of the space 40 is preferably made small. However, the clearance afforded thereby further effectively precludes thermoenergy transfer from the weld 34 to the subjacent wire portion thereby further maintaining the metallurgical characteristics of the wire as discussed above.

The present invention provides an improved clad wire 10 wherein the cladding is effected by a welding process which minimizes the amount of welded portions 34 in the clad wire 10. As the welding operation is precluded from affecting the subjacent wire material by virtue of controlling the depth thereof to space the weld outwardly of the outer surface of the wire in the welding operation, the metallurgical characteristics of the wire are unaffected by the welding operation permitting the clad wires 10 to be utilized effectively, such as the sheathed wires disclosed in said U.S. Letters Pat. No. 3,277,564.

Thus, the clad wires 42 may be continuously economically formed by the disclosed method by means of the illustrated apparatus 13. Resulting substantial economies in the manufacture of filaments, such as disclosed in the above indicated Webber et al. patent, may be thusly effected for further making practical the use of such metal filaments as textile materials of low cost and improved characteristics.

While we have shown and described one embodiment of our invention, it is to be understood that it is capable of many modifications. Changes, therefore, in the construction and arrangement may be made without departing from the spirit and scope of the invention as defined in the appended claims.

We claim:

1. The method of forming a sheathed element comprising the steps of:

feeding a wire longitudinally to a cladding zone;

feeding a cladding strip longitudinally into juxtaposition to said wire at said zone, said strip beng formed of a deformable material forming the strip at said zone circumferentially about the wire to sheath the same;

welding together the juxtaposed longitudinal edges of the strip less than fully through the thickness of said strip; and constricting the sheathed wire to cause the strip material to deform and define a substantially continuous tubular element sheathing the wire.

2. The method of forming a sheathed element of claim 1 wherein said wire is formed of metal.

3. The method of forming a sheathed element of claim 1 wherein said strip is formed of metal.

4. The method of forming a sheathed element of claim 1 wherein said constricting step comprises a drawing step.

5. The method of forming a sheathed element of claim 1 wherein the strip width is preselected to be no greater than the outer diameter of the wire.

References Cited

UNITED STATES PATENTS

| 661,108 | 11/1900 | Schmitz | 29—474.1X |
|---|---|---|---|
| 3,154,846 | 11/1964 | Alexander | 29—474.1X |
| 3,277,564 | 10/1966 | Webber et al. | 29—417X |
| 3,405,228 | 10/1968 | Polizzano | 29—474.1X |
| 3,430,330 | 3/1969 | Garner | 29—474.1X |

JOHN F. CAMPBELL, Primary Examiner

R. B. LAZARUS, Assistant Examiner

U.S. Cl. X.R.

29—473.3, 473.9